(12) United States Patent
Imazaki et al.

(10) Patent No.: US 10,310,758 B2
(45) Date of Patent: Jun. 4, 2019

(54) STORAGE SYSTEM AND STORAGE CONTROL METHOD

(71) Applicant: HITACHI, LTD., Tokyo (JP)

(72) Inventors: Miho Imazaki, Tokyo (JP); Norio Simozono, Tokyo (JP); Junji Ogawa, Tokyo (JP); Tomohiro Yoshihara, Tokyo (JP); Akira Yamamoto, Tokyo (JP); Hiroaki Akutsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 273 days.

(21) Appl. No.: 15/122,770

(22) PCT Filed: Mar. 26, 2014

(86) PCT No.: PCT/JP2014/058551
§ 371 (c)(1),
(2) Date: Aug. 31, 2016

(87) PCT Pub. No.: WO2015/145617
PCT Pub. Date: Oct. 1, 2015

(65) Prior Publication Data
US 2017/0075615 A1    Mar. 16, 2017

(51) Int. Cl.
*G06F 3/06* (2006.01)
*G06F 11/10* (2006.01)

(52) U.S. Cl.
CPC .............. *G06F 3/0631* (2013.01); *G06F 3/06* (2013.01); *G06F 3/0604* (2013.01);
(Continued)

(58) Field of Classification Search
CPC ...... G06F 3/0665; G06F 3/065; G06F 3/0688; G06F 2212/7208; G06F 11/108; G06F 11/2053
See application file for complete search history.

(56) References Cited

U.S. PATENT DOCUMENTS 7,603,529 B1 * 10/2009 MacHardy ............ G06F 3/0608
707/999.202
8,108,640 B1 * 1/2012 Holl, II ................ G06F 11/1458
711/162

(Continued)

FOREIGN PATENT DOCUMENTS

JP    2006-031694 A    2/2006
JP    2009-251786 A    10/2009

*Primary Examiner* — Edward J Dudek, Jr.
*Assistant Examiner* — Andrew Russell
(74) *Attorney, Agent, or Firm* — Volpe and Koenig, P.C.

(57) ABSTRACT

A second virtual volume having a plurality of second virtual areas is a clone of a first virtual volume having a plurality of first virtual areas. A first real area is allocated from a pool of real areas and based on storage devices to the first virtual volume. A storage controller allocates a second real area to the second virtual area before a write occurs in the second virtual area corresponding to the first virtual area to which the first real area is allocated. A physical area is allocated to a logical area corresponding to the first real area in each storage device, and data based on user data stored in the first real area is stored in the physical area. Each storage device allocates the physical area allocated to the logical area corresponding to the first real area to a logical area corresponding to the second real area.

14 Claims, 11 Drawing Sheets

(52) U.S. Cl.
CPC .......... *G06F 3/0665* (2013.01); *G06F 3/0683* (2013.01); *G06F 11/108* (2013.01); *G06F 2212/7208* (2013.01)

(56) References Cited

U.S. PATENT DOCUMENTS

| | | | |
|---|---|---|---|
| 9,317,419 B1* | 4/2016 | Bono | G06F 12/023 |
| 2006/0020753 A1 | 1/2006 | Cochran et al. | |
| 2006/0143412 A1 | 6/2006 | Armangau | |
| 2008/0320214 A1* | 12/2008 | Ma | G06F 3/0613 |
| | | | 711/103 |
| 2009/0157989 A1* | 6/2009 | Karamcheti | G06F 12/0246 |
| | | | 711/156 |
| 2009/0254722 A1 | 10/2009 | Kobashi | |
| 2010/0211737 A1* | 8/2010 | Flynn | G06F 3/0616 |
| | | | 711/114 |
| 2013/0067139 A1 | 3/2013 | Yamamoto et al. | |
| 2014/0068200 A1* | 3/2014 | Schnapp | G06F 3/0605 |
| | | | 711/144 |

\* cited by examiner

FIG. 4

PG management information

PG#0
Use drive management 122

| VOL # | RAID configuration | Drive # | Start address |
|---|---|---|---|
| 0 | RAID6 (6+2P) | 0 | 0x0000 |
| | | 1 | 0x0000 |
| | | 2 | 0x0000 |
| | | 3 | 0x0000 |
| | | 4 | 0x0000 |
| | | 5 | 0x0000 |
| 1 | RAID6 (6+2P) | 0 | 0x1000 |
| | | 1 | 0x1000 |
| | | 2 | 0x1000 |
| | | 3 | 0x1000 |
| | | 4 | 0x1000 |
| | | 5 | 0x1000 |

⋮

Stripe group management 132

| VOL # | Stripe group # | P Parity storage drive # | Q Parity storage drive # | Bit in use |
|---|---|---|---|---|
| 0 | 0 | 5 | 4 | 0 |
| | 1 | 4 | 3 | 1 |
| | 2 | 2 | 1 | 0 |

⋮

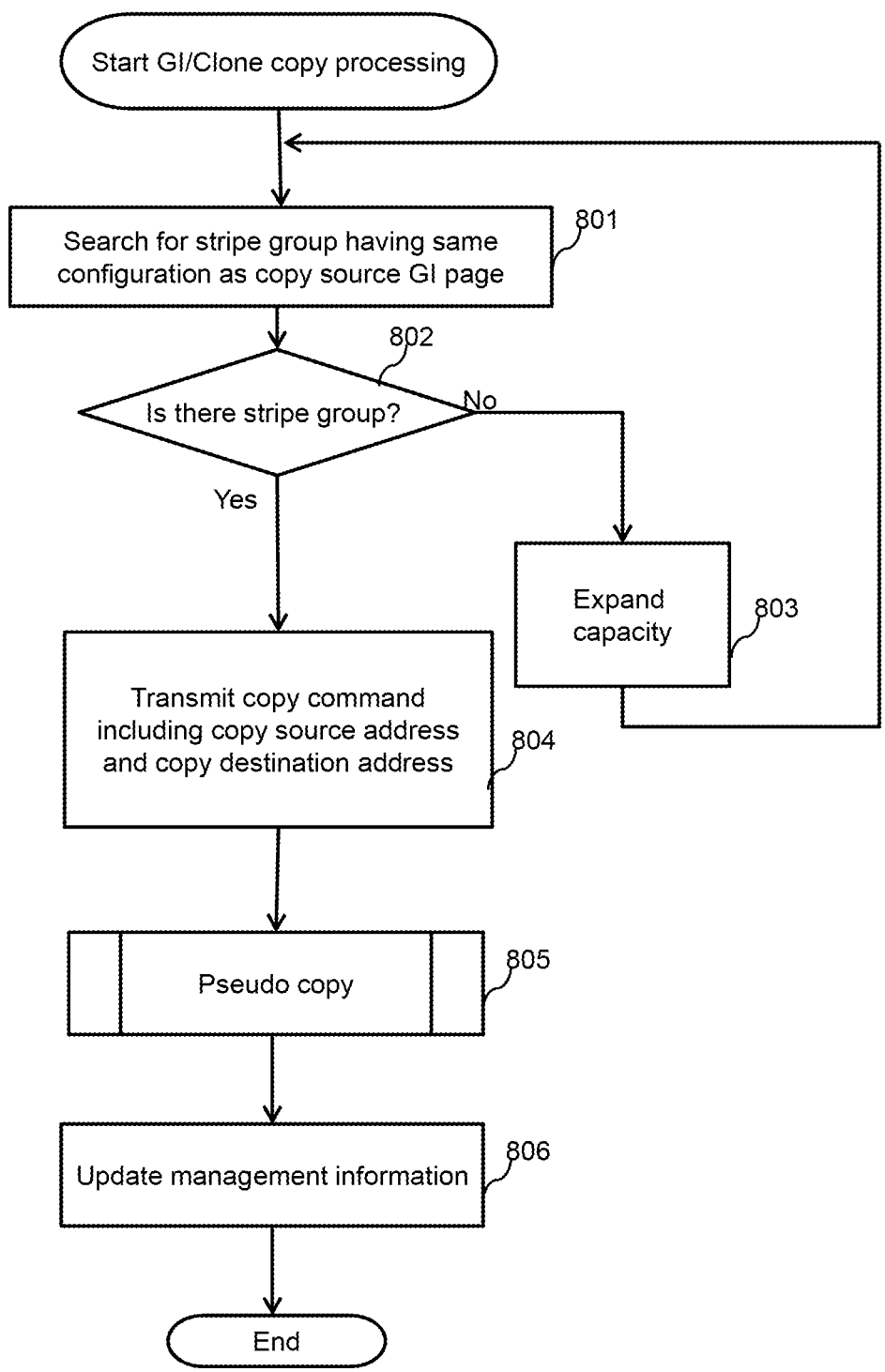

STORAGE SYSTEM AND STORAGE CONTROL METHOD

TECHNICAL FIELD

The present invention generally relates to storage control, and relates to storage control of a storage system that provides a virtual logical volume complying with Thin Provisioning, for example.

BACKGROUND ART

In a storage system, there is a case of creating a clone of a certain logical volume (primary volume).

For example, in PTL 1, the storage system includes a flash package group configured with a plurality of flash packages and a storage controller coupled to each of the flash packages. A generation number for identifying a difference volume that stores difference data between data in another volume and data in a primary volume, in addition to a write destination address, are associated with a write request from the storage controller to each of the flash packages. Each of the flash packages manages latest data of the same address by generation.

Further, for example, in PTL 2, the storage controller stores data in a cache memory before storing data in a drive.

CITATION LIST

Patent Literature

[PTL 1]: US 2013/0067139
[PTL 2]: US 2006/0143412

SUMMARY OF INVENTION

Technical Problem

For example, a storage system includes one or more storage devices, and a storage controller that controls accesses to the one or more storage devices. The storage controller can manage a virtual volume configured with a plurality of virtual areas (virtual logical volume complying with Thin Provisioning), and a pool configured with a plurality of real areas and based on the one or more storage devices. The storage controller receives a write request that specifies a virtual volume from a host computer, and when a real area is not allocated to a write destination virtual area according to the write request, the storage controller allocates a free real area as the write destination virtual area from the pool, and can write target user data to the allocated real area. The user data written in the real area is actually written in the one or more storage devices that are bases for the allocated real area.

Assume that the storage controller manages a second virtual volume configured with a plurality of second virtual areas as a clone of a first virtual volume configured with a plurality of first virtual areas. Further, any real areas are not allocated to the second virtual volume. Further, the storage controller includes a cache memory. In this state, when having received a write request that specifies the second virtual volume from the host computer, the storage controller reads user data from a real area allocated to a first virtual area corresponding to a write destination second virtual area to the cache memory, and updates the user data in the cache memory using write target data. Further, the storage controller newly secures a real area that is to be a write destination of the updated user data from the pool, and allocates the secured real area to the write destination second virtual area. The updated user data is written in the real area allocated to the write destination second virtual area.

According to the above description, even if a real area is allocated to the first virtual area, a real area is not allocated to the second virtual area corresponding to the first virtual area, and when write occurs in the second virtual area, the user data is read to the cache memory by the storage controller. Therefore, a load to the storage controller becomes high. Further, when the read user data exists in the cache memory like PTL 2, it can be considered to secure an area of a copy destination in the cache memory, and to copy the user data in the cache memory (copy source data) to the copy destination area. However, similarly to the above, the load to the storage controller is high.

Solution to Problem

The storage controller allocates a second real area to the second virtual area before write occurs in the second virtual area corresponding to the first virtual area to which the first real area is allocated. In each of the storage devices, a physical area is allocated to a logical area corresponding to the first real area, and data based on the user data stored in the first real area is stored in the physical area. Each of the storage devices also allocates the physical area allocated to the logical area corresponding to the first real area to the logical area corresponding to the second real area.

Advantageous Effects of Invention

Even if write occurs in the second virtual area corresponding to the first virtual area to which the first real area is allocated, it is not necessary to read the user data from the first real area by the storage controller. Further, even if the second real area is allocated before write occurs in the corresponding second virtual area, write does not occur in each of the one or more storage devices that are the bases of the allocate second real area.

BRIEF DESCRIPTION OF DRAWINGS

FIG. 4 is a configuration of PG management information.
FIG. 8 illustrates a flow of GI/Clone copy processing.

DESCRIPTION OF EMBODIMENTS

Figure 1:
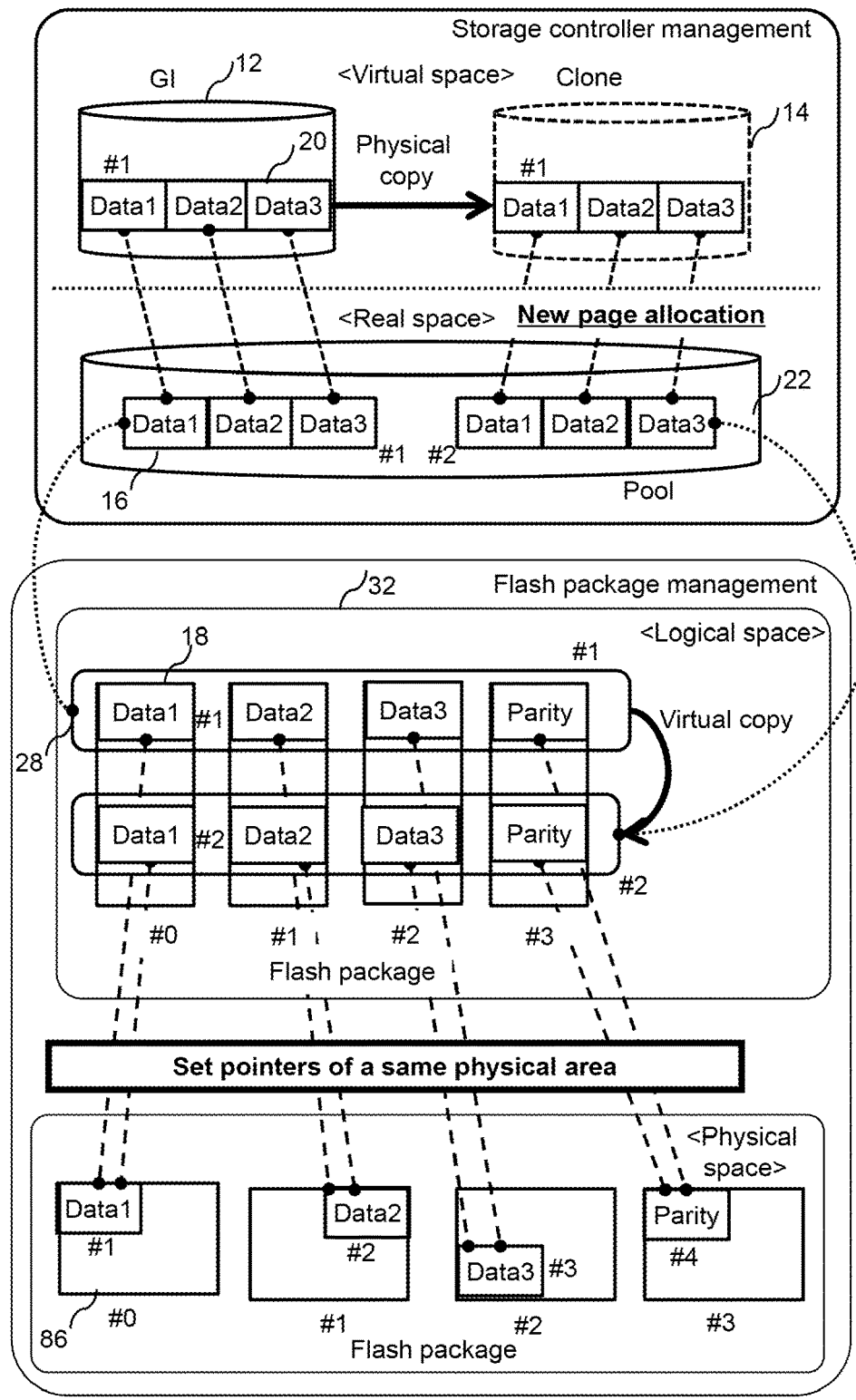
FIG. 1 is a diagram illustrating an outline of an embodiment.

Hereinafter, an embodiment will be described.

In the description below, numbers are used as information for identifying a target. However, other types of identification information may be used instead of the numbers.

Further, in the description below, "processor" (for example, a central processing unit (CPU)) can perform predetermined processing appropriately using a storage resource (for example, a memory) and/or a communication interface by executing a computer program. Therefore, the subject of the processing may be a controller that includes the processor, in place of the processor. Further, a hardware circuit that performs a part or all of the processing executed by the processor may be included. The computer program may be installed from a program source to an apparatus. The program source may be a program distribution server, or a storage medium readable by the computer, for example.

Further, in the description below when the same type of elements are descried without being distinguished, a reference number allocated to the elements may be used (for example, flash package 86), and when the same type of elements are described with being distinguished, a combination of a mark "#" and the number allocated to the elements (for example, flash package #0) may be used.

Further, in the description below, a virtual logical volume complying with Thin Provisioning is called "TPVOL", each of a plurality of virtual areas (virtual storage areas) that configured the TPVOL is called "virtual page", and each of a plurality of real areas (substantive storage area) that configures a pool is called "real page". Further, in the description below, write target data in a virtual page is called "user data". According to Thin Provisioning, a free real page is allocated to a virtual page of a write destination of the user data, and the user data is written in the allocated free real page.

Further, in the description below, a physical storage device is a flash package. The flash package includes a flash memory, and the flash memory is configured with a plurality of "physical blocks". Each of the physical blocks is configured with a plurality of "physical pages". Further, in the description below, data is accessed (read and written) in physical page units, and the data is erased in physical block units. Further, in the description below, a logical space provided by the flash package is configured with a plurality of "logical blocks", and each of the logical blocks is configured with a plurality of "logical pages". Further, in the description below, when the flash memory is write-once type flash memory, to be specific, when a logical page to which a physical page is allocated is a write destination, a free physical page is newly allocated to a write destination logical page in place of the allocated physical page, and data is written in the newly allocated real page. Regarding each of the logical pages, the data written in the newly allocated physical page is "valid data", and the physical page in which the valid data is written is a "valid page", and data stored in the physical page allocated in the past is "invalid data", and the physical page in which the invalid data is written is a "invalid page".

FIG. 1 is a diagram illustrating an outline of an embodiment.

A storage system includes a flash package group and a storage controller coupled to the flash package group. The flash package group is a redundant array of independent (or inexpensive) disks (RAID) group, and is configured with a plurality of flash packages 86. Each of the flash packages 86 includes a flash memory and a flash controller coupled to the flash memory.

The flash controller of each of the flash packages 86 provides a logical space. The storage controller manages a pool 22 based on a plurality of logical spaces respectively provided from the plurality of flash packages. The pool 22 is divided into a plurality of real pages 16. Each of the real pages 16 corresponds to a stripe group 28 extending over the plurality of logical spaces respectively provided by the plurality of flash packages 86. In the present embodiment, for making the description to easier understand, each of the real pages 16 corresponds to one stripe group 28. However, each of the real pages 16 may correspond to a plurality of stripe groups 28. Further, in the present embodiment, a "stripe" is a part of a logical space provided by one flash package, and a "stripe group" is a set of a plurality of stripes respectively provided by the plurality of flash packages, as described above. Since the stripe group 28 is a logical space portion based on the flash package group, each of stripes 18 that configure the stripe group 28 stores data such as user data portion (described as "Data" in FIG. 1) or user parity (described as "Parity" in FIG. 1) calculated based on the user data (a plurality of user data portions) according to a RAID level of the flash package group. Each of the stripes 18 is a set of one or a plurality of logical pages. In the present embodiment, for making the description to easier understand, each of the stripes 18 corresponds to one logical page. The logical page is an example of the logical area.

The storage controller provides a TPVOL. The TPVOL is configured with a plurality of virtual pages 20, and is associated with the pool. The storage controller manages a second TPVOL as a clone of a first TPVOL. In the description below, an example of the first TPVOL is called "GI" (GI is an abbreviation of golden image), and an example of the second TPVOL is called "Clone". Further, in the description below, each virtual page in the GI is called "GI page", and each virtual page in the clone is called "Clone page". Further, the flash package group exemplarily illustrated in FIG. 1 is configured with four flash packages #0 to #3, and three user data portions and one parity are written in one stripe group.

Write of the user data written to a GI page #1 will be described.

The storage controller allocates, to the GI page #1 as a write destination in a GI 12, a free real page #1 from the pool 22 associated with the GI 12, and writes write target user data to the allocated free real page #1. To be specific, the storage controller divides the user data into three user data portions, calculates a parity based on the three user data portions, and writes the four data (three user data portions (for example, Data 1, Data 2, and Data 3) and the parity (Parity)) in four stripes that configure a stripe group #0 corresponding to the allocated real page #1, respectively. To be specific, the storage controller transmits write commands to the four flash packages #0 to #3, respectively. Data to be written of the write commands are the user data portions and the parity. Addresses specified by the write commands logical addresses of the stripes in the stripe group corresponding to the allocated real page. Each of the flash controllers of the flash packages #0 to #3 receives the write command, and writes a free physical page in the flash memory to the logical page indicated by the logical address specified in the write command, and writes the write target data in the allocated free physical page. That is, the user data stored in the real page #1 is actually stored in a plurality of physical pages #1 to #4 respectively allocated to the plurality of logical pages corresponding to the real page #1. Similarly, reading of the user data from the real page #1 is actually reading from the plurality of physical pages #1 to #4 respectively allocated to the plurality of logical pages corresponding to the real page #1.

The storage controller controls a state (for example, free or allocated) of each of the real pages (stripe groups) in the pool, a corresponding relation between a virtual address (for example, a virtual page) and a real address (for example, a real page), a configuration of each of the stripe groups (for example, a number of a flash package in which the parity is stored), and the like. The flash controller of each of the flash packages manages a state (for example, free or allocated) of each of the physical blocks, a state (for example, free, allocated, or invalid) of each of the physical pages, a corresponding relation between a logical address (for example, a logical page) and a physical address (for example, a physical page, and the like.

The storage controller performs physical copy, for each GI page to which a real page is allocated, before write occurs in the Clone page corresponding to the GI page. In the present embodiment, a "physical copy" is to allocate a real page (#2) different from the real page (#1) allocated to a copy source GI page (#1) to a copy destination Clone page (#1) corresponding to the copy source GI page (#1) from the pool 22. The "copy source GI page" is a GI page to which a real page is allocated. The "copy destination Clone page" is a Clone page corresponding to the copy source GI page, for example, a Clone page to which a virtual address that is the same as the virtual address of the copy source GI page in the GI is assigned. The "before write occurs in the Clone page corresponding to the GI page" may mean when a Clone has been generated about the GI, or may mean, while the storage controller has received a write request that specifies the virtual address of the Clone page corresponding to the GI page, but before actually performing write to the Clone page.

For example, by performing of the physical copy of the copy source GI page #1, the user data (Data 1 to Data 3) are copied from the copy source GI page #1 to the copy destination Clone page #1 in a pseudo manner. To be specific, by performing of the physical copy of the copy source GI page #1, the user data stored in the real page #1 allocated to the copy source GI page #1 is stored in the real page #2 allocated to the copy destination Clone page #1 in a pseudo manner.

In a lower management layer than a management layer of the GI 12, the Clone 14, and the pool 22, virtual copy corresponding to the physical copy is performed for each physical copy. The "virtual copy" is pseudo copy between the stripe groups. For example, with the virtual copy corresponding to the physical copy about the copy source GI page #1, the four data (Data 1, Data 2, Data 3, and Parity) are copied from the strip group #1 corresponding to the real page #1 allocated to the copy source GI page #1 to the stripe group #2 corresponding to the real page #2 allocated to the copy destination Clone page #1 in a pseudo manner. However, in each of the flash packages #0 to #3 that are the bases of the copy destination stripe group #2, write does not actually occur. For example, in the flash package #0, the physical page #1 allocated to the logical page #1 included in the copy source stripe group #1 is also allocated (pointed) to the logical page #2 included in the copy destination stripe group #2. The same applies to other flash packages #1 to #3. Accordingly, the virtual copy corresponding to the physical copy of the copy source GI page #1 is completed.

As described above, the plurality of physical pages allocated to the plurality of stripes that configures the copy source stripe group #1 is also allocated to the plurality of stripes that configures the copy destination stripe group #2, whereby the virtual copy is completed without actually causing the copy of data in the flash package. Here, the storage controller searches for a free real page #2 corresponding to the stripe group #2 having the same configuration as the copy source stripe group #1 (the stripe group #1 corresponding to the real page #1 allocated to the copy source GI page #1), as a free real page #2 to be allocated to the copy destination Clone page #1. The "stripe group having the same configuration to the copy source stripe group" is a stripe group having the same flash package 86 in which the parity is stored as the copy source stripe group. When the RAID level of the flash package group is RAID 5 (for example, 3D+1P like the example of FIG. 1), the number of parities stored in one stripe group is one. However, when the RAID level is RAID 6, two parities (P parity and Q parity) are stored in one parity group. In this case, the "stripe group having the same configuration as the copy source stripe group" is a stripe group having the same flash package in which the same type of parity is stored as the copy source stripe group.

According to the present embodiment, the physical page allocated to the stripe in the copy source stripe group is allocated to the stripe in the copy destination stripe group, whereby the copy is completed. Accordingly, the copy time can be shortened. Further, the storage controller recognizes that the data has been physically copied from the copy source GI page to the copy destination Clone page. Therefore, even if the copy destination Clone page is a write destination, a write-once type write is caused in each of the flash packages without reading the user data from the real page allocated to the copy source GI page.

In recent years, the flash storage market is on an expanding trend, and all flash models in which the storage devices that configure the storage system are all flash memory devices have been released from vendors. As a major use case, there is a virtual desktop (VDI). The VDI has drawn attention in terms of improvement in security, a reduction in an operation load, a decrease in cost, and the like. In an actual operation, there is a problem of a decrease in performance due to simultaneous start after a break and access concentration. As the VDI, for example, a virtual volume is employed in view of capacity expansion processing efficiency. According to the present embodiment, the VDI is operable without decreasing access performance. Further, physical capacity expansion processing consumption by data copy (consumption of a physical storage capacity expansion processing of the flash memory device) is zero, and thus the capacity expansion processing efficiency is good, and a cheap and good performance VDI can be provided to the user.

An outline of the present embodiment has been described. Note that a single storage device (physical storage device) may be employed, instead of the flash package group. Further, not only the flash memory device like the flash package, but also other types of storage devices (for example, other types of write-once type storage devices), such as non-volatile memory devices having a semiconductor memory, including a magnetoresistive random access memory (MRAM) that is a magnetoresistive memory, a resistance random access memory (ReRAM) that is a resistance change type memory, and a ferroelectric random access memory (FeRAM) that is a ferroelectric memory.

Further, the pool may be based on a plurality of flash package groups having different RAID levels.

Hereinafter, the present embodiment will be described in detail.

Figure 2:
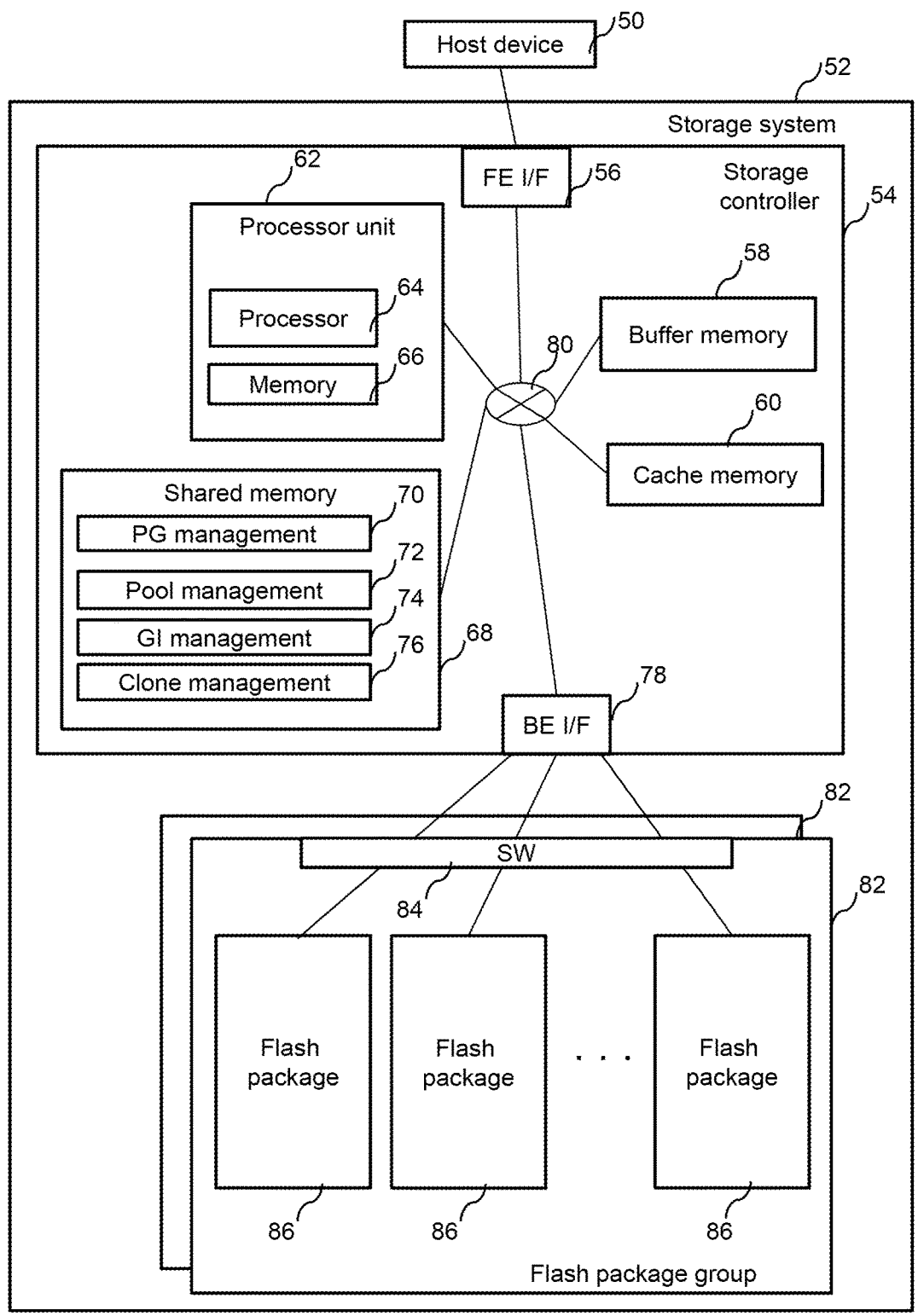
FIG. 2 is a configuration diagram of a storage system according to an embodiment.

FIG. 2 is a configuration diagram of a storage system according to an embodiment.

At least one host computer 50 is coupled to a storage system 52. The host computer 50 may be one or more computers. The host computer 50 includes at least one physical computer, and may execute one or a plurality of virtual computers. The GI may be provided to the first host computer 50 (for example, a first virtual computer), and the Clone may be provided to the first or the second host computer 50 (for example, a second virtual computer). The second virtual computer may transmit an access request (a write request or a read request) that specifies the Clone.

The storage system includes a plurality (or one) flash package groups (RAID groups) 82, and a storage controller 54 coupled to the plurality of flash package groups 82.

Each of the plurality of flash package groups 82 includes a switch 84, and a plurality of flash packages 86 coupled to the switch 84. The switch 84 is coupled to the storage controller 54.

The storage controller 54 includes communication interface devices (hereinafter, I/Fs), memories, and a processor coupled thereto. The I/Fs are, for example, an FE I/F 56 and a BE I/F 78. The memories are, for example, a cache memory 60, a buffer memory 58, and a shared memory 68. The processor is, for example, a processor 64. The processor 64 is incorporated in a processor unit 62, and the processor unit 62 includes a memory 66. The FE I/F 56, the BE I/F 78, the cache memory 60, the buffer memory 58, the shared memory 68, and the processor unit 62 are coupled to a data transfer control unit (for example, a switch or a bus) 80. A plurality of at least one of these configuration elements may exist for the purpose of redundancy.

The FE I/F 56 is a front-end I/F, and receives an access request from the host computer 50. The FE I/F 56 is one or more communication interface devices, and includes one or more communication ports.

The BE I/F 78 is a back-end I/F, and is coupled to the flash packages 86 through the switch 84. Commands (for example, access commands such as write commands or read commands) are transmitted to the respective flash packages 86 through the BE I/F 78. The BE I/F 78 is one or more communication interface devices, and includes one or more communication ports.

The cache memory 60 is a memory in which data (for example, the user data portions and the parity) input/output to/from the flash package group 82 are temporarily stored. Even if the data is read from the cache memory 60, the read data is remained in the cache memory 60.

The buffer memory 58 is a memory in which the data input/output to/from the cache memory 60 is temporarily stored. For example, the data read from the flash package group 82 may be written in the cache memory 60 through the buffer memory 58, and data according to a write request from the host computer 50 may be written in the cache memory 60 through the buffer memory 58. When the data is read from the buffer memory 58, the read data is not remained in the buffer memory 58.

The shared memory 68 stores, as management information, for example, PG management information 70 related to the flash package groups, pool management information 72 related to the pool, GI management information 74 related to the GI, and Clone management information 76 related to the Clone. The shared memory 68 may store a computer program executed by the processor 64.

The processor 64 in the processor unit 62 executes various types of processing by appropriately using the memory 66. For example, the memory 66 stores a storage control program (not illustrated), and the processor 64 executes the program, thereby to execute the various types of processing. To be specific, the processor 64 processes the access request received through the FE I/F 56 based on the management information in the shared memory 68. At that time, when the processor 64 needs to access (read or write) the flash package group 82, for example, the processor 64 transmits access commands to the respective flash packages 86 that are access destinations in the flash package group 82. The access command includes, for example, a command type (for example, read or write) and a logical address of the access destination. Note that, in the present embodiment, pseudo copy that is processing of allocating the physical page allocated to the logical page included by the stripe in the copy source strip group to the logical page included in the stripe in the copy destination strip group is performed in each of the flash packages 86 as described above. In the present embodiment, a copy command for executing such pseudo copy is prepared. The copy command includes a copy source address (the logical address of the logical page included in the stripe in the copy source stripe group), and a copy destination address (the logical address of the logical page included in the stripe in the copy destination stripe group). The copy command may further include a copy type as a command type. The copy type may indicate whether real copy or pseudo copy. In the case of the pseudo copy, copy of data between physical pages (physical blocks) does not occur, and only the control of a pointer of a physical page is performed. In the case of the real copy, actual copy of data between the physical pages (physical blocks) may occur.

Figure 3:
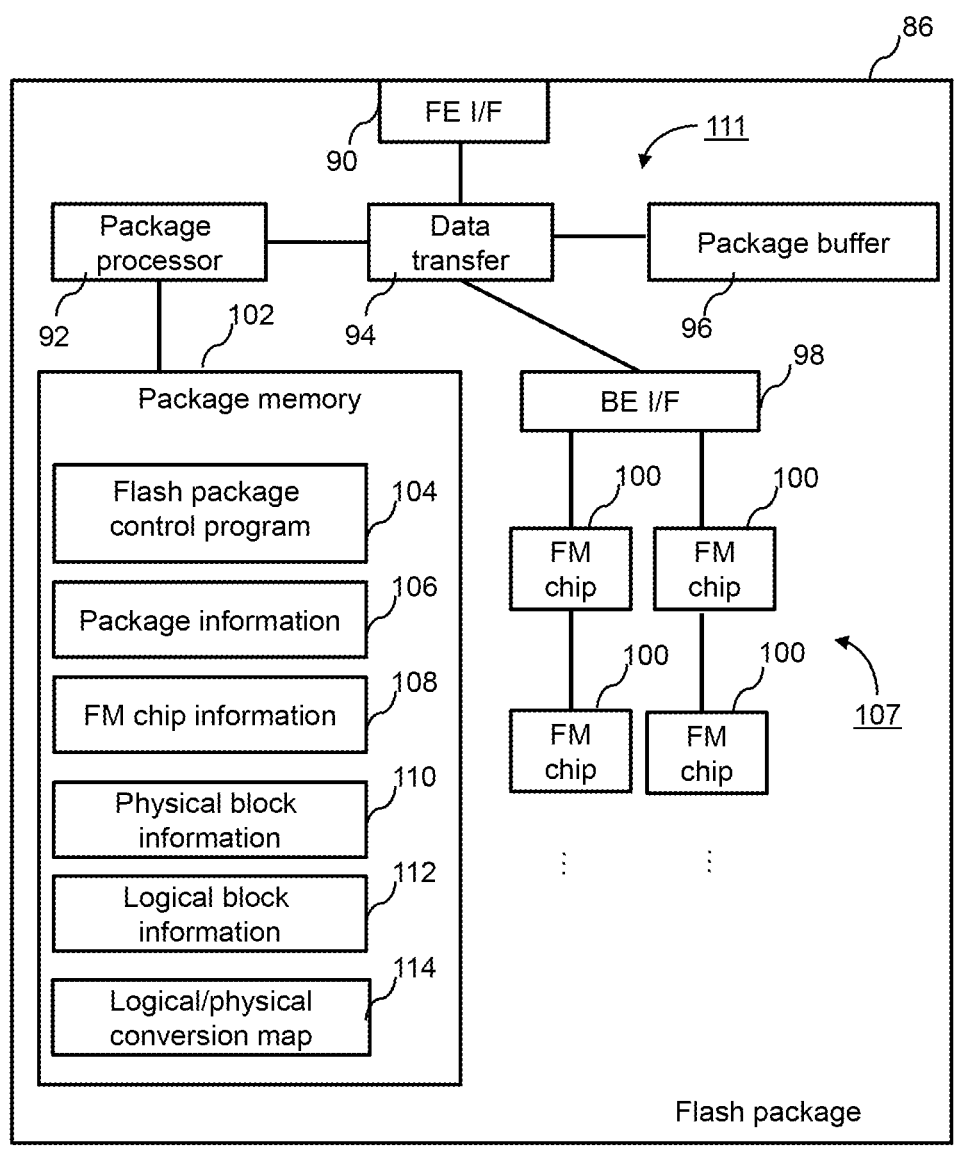
FIG. 3 is a configuration diagram of a flash package.

FIG. 3 is a configuration diagram of the flash package 86.

The flash package 86 includes a flash memory 107, and a flash controller 111 coupled to the flash memory 107.

The flash memory 107 is configured with a plurality of flash memory (FM) chips 100. Each of the FM chips is configured with a plurality of physical blocks, and each of the physical blocks includes a plurality of physical pages. As described above, the data is write-once type data, and the data is erased in physical block units. Input/output of the data is performed in physical page units.

The flash controller 111 includes I/Fs, memories, and a processor coupled thereto. The I/Fs are, for example, an FE I/F 90 and a BE I/F 98. The memories are, for example, a package buffer 96 and a package memory 102. The processor is, for example, a package processor 92. The FE I/F 90, the BE I/F 98, the package buffer 96, the package memory 102, and the package processor 92 are coupled to a data transfer control unit (for example, a switch or a bus) 94. A plurality of at least one of these configuration elements may exist for the purpose of redundancy.

The FE I/F 90 is a front-end I/F, and receives an access command from the storage controller 54. The FE I/F 90 is one or more communication interface devices, and includes one or more communication ports.

The BE I/F 98 is a back-end I/F, and is coupled to the FM chips 100. Input/output of data in physical page units to the FM chips 100 is performed through the BE I/F 98. The BE I/F 98 is one or more communication interface devices.

The package buffer 96 temporarily stores the data input to the FM chip 100. For example, when data in the logical page to which the physical page is allocated is updated, the data is read from the physical page to the package buffer 96, the data is updated in the package buffer 96, and updated data may be written in a new physical page.

The package memory 102 stores at least one of computer programs and management information. The computer program is, for example, a flash package control program 104. The management are, for example, package information 106 related to the flash package 86, FM chip information 108 related to the FM chips 100, physical block information 110 related to the physical blocks, logical block information 112 related to the logical blocks, and a logical/physical conversion map 114 illustrating a corresponding relation between a logical address and a physical address.

The package processor 92 executes various types of processing by appropriately using the package memory 102. For example, the package processor 92 executes the flash package control program 104 in the package memory 102, thereby to execute the various types of processing. To be specific, the package processor 92 receives a write command from the storage controller 54 through the FE I/F 90, and writes, in the FM chips 100 through the BE I/F 98 based on the write command, the data (data according to the write command) temporarily stored in the package buffer 96 from the cache memory 69 through the data transfer unit control unit 94. The package processor 92 updates the logical/physical conversion map 114, that is, allocates the physical address of the physical page of the write destination to the logical address specified by the write command.

Hereinafter, the management information included in the storage controller 54, and the management information included in the flash controller 111 will be described.

FIG. 4 is a configuration diagram of the PG management information 70.

The PG management information 70 includes a PG management information unit 120 for each flash package group 82. FIG. 4 illustrates the PG management information unit 120 of one flash package group #0 as an example. Thus, in the description for FIG. 4, the flash package group #0 will be employed as an example. The PG management information unit 120 includes use drive management information 122 and stripe group management information 132.

The use drive management information 122 indicates information of a VOL (logical volume) created based on the flash package group #0. The use drive management information 122 includes, for each VOL, a VOL # (an identification number of the VOL) 124, a RAID configuration (a RAID configuration of the flash package group #0 that is the base of the VOL (for example, the RAID level and the number of parities)) 126, a drive # (an identification number of the flash package that is the base of the VOL) 128, a real start dress (a start logical address of the flash package that is the base of the VOL) 130.

The stripe group management information 132 indicates information of the stripe group based on the flash package group #0. The stripe group management information 132 includes, for each stripe group based on the flash package group #0, a VOL # (an identification number of the VOL including the stripe group) 134, a stripe group # (an identification number of the stripe group) 136, a P Parity storage drive # (an identification number of the flash package in which the P parity is stored) 138, Q Parity storage drive # (an identification number of the flash package in which the Q parity is stored) 140, and a bit in use 142. The bit in use is "1" that means the real page is in use when the real page corresponding to the corresponding stripe page has been allocated, and is "0" that means free (unused) when the real page corresponding to the corresponding stripe group is free.

The storage controller 54 refers to the stripe group information 132 to be able to search for a stripe group having the same configuration as the copy source stripe group. Note that the configuration of the stripe group information 132 may differ according to the RAID configuration (RAID level) of the corresponding flash package group #0. For example, when the RAID level of the flash package group #0 is RAID 5, the P Parity storage drive #138 may just be included, and the Q Parity storage drive #140 may not be included.

Figure 5:
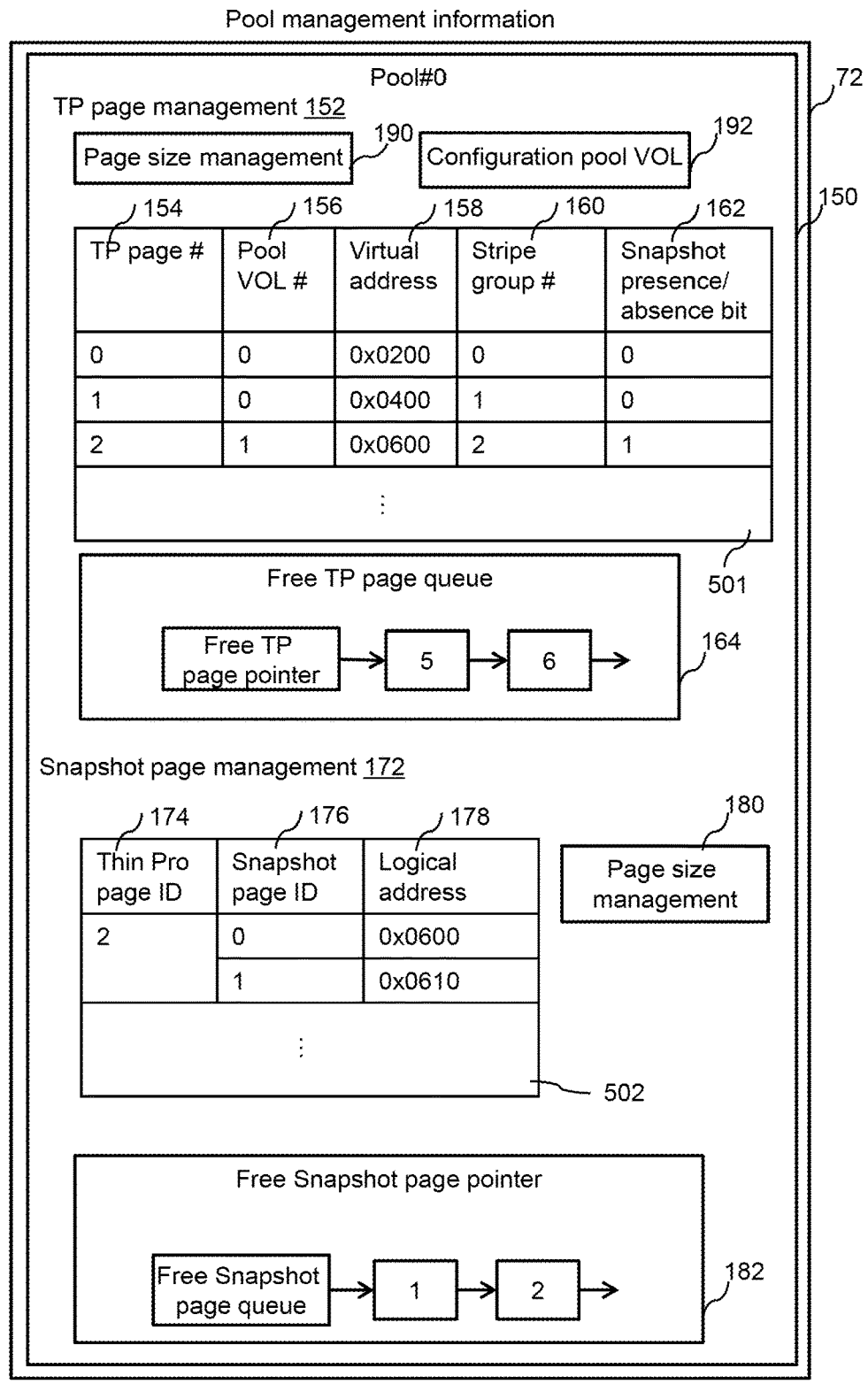
FIG. 5 is a configuration diagram of pool management information.

FIG. 5 is a configuration diagram of the pool management information 72.

The pool management information 72 includes, for each pool 22, a pool management information unit 150. FIG. 5 illustrates the pool management information unit 150 of one pool #0, and thus the description for FIG. 5 describes the pool #0 as an example. The pool management information unit 150 includes configuration pool VOL information 192, TP page management information 152, and snapshot page management information 172. The "TP page" is a real page, and one TP page is allocated to one virtual page according to Thin Provisioning. Meanwhile, the "snapshot page" is each of a plurality of sub real pages that is division of the TP page. Therefore, a plurality of snapshot pages is allocated to one virtual page. Use of the snapshot page will be described below.

The configuration pool VOL information 192 includes one or more VOL #-s respectively corresponding to one or more pool VOLs that configure the pool #0. The "pool VOL" is a VOL as a configuration element of the pool. The pool VOL is divided into two or more real pages.

The TP page management information 152 is information related to TP pages. The TP page management information 152 includes TP page size information 190 that indicates the size of the TP page, TP page configuration information 501 that indicates details of each TP page, and free TP page queue 164 in which TP page #-s (the identification numbers of TP pages) of free TP pages are linked. The TP page configuration information 501 includes, for each TP page that configures the pool #0, a TP page # (an identification number of the TP page) 154, a pool VOL # (an identification number of a pool VOL having the TP page) 156, a virtual address (an address of a virtual page of an allocation destination of the TP page), a stripe group # (an identification number of a stripe group corresponding to the TP page), and a snapshot bit (whether the TP page is used as a snapshot page) 162. The snapshot presence/absence bit 162 is "1" when the TP page is used as a snapshot page, and is "0" when the TP page is not used as a snapshot page". As for the free TP page, a virtual address 158 is an invalid value (for example, "Null" or a blank), and the snapshot presence/absence bit 162 is "0".

The snapshot page management information 172 is information related to snapshot pages. The snapshot page management information 172 includes snapshot page size information 180 that indicates the size of the snapshot page, snapshot page configuration information 502 that indicates details of each snapshot page, and free snapshot page queue 182 in which snapshot page #-s (identification numbers of snapshot pages) of free snapshot pages are linked. The snapshot page configuration information 502 includes, for each snapshot page in the pool #0, a TP page # (an identification number of a TP page started to be managed as a snapshot real page) 174, a snapshot page # (an identification number of the snapshot page) 176, a virtual address (an address of an allocation destination area in an allocation destination virtual page of the snapshot page), and a stripe group # (an identification number of a stripe group corresponding to the snapshot page). In the present embodiment, the size of the TP page is a multiple of the size of the snapshot page.

Figure 6A:
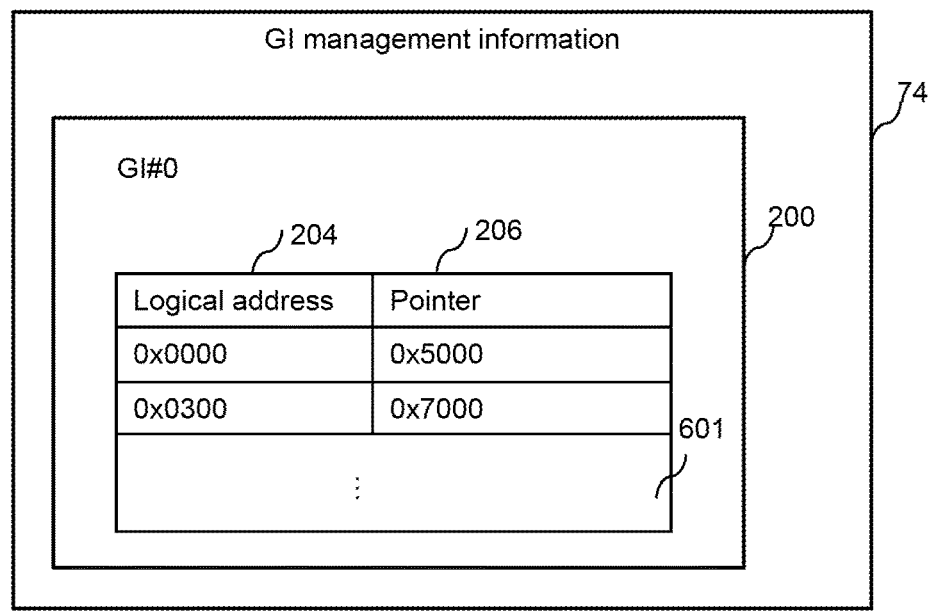
FIG. 6A is a configuration diagram of GI management information.

FIG. 6A is a configuration diagram of the GI management information 74.

The GI management information 74 includes a GI management information unit 200 for each GI. FIG. 6A illustrates the GI management information unit 200 of one GI #0 as an example, and thus, in the description for FIG. 6A, the GI #0 will be employed as an example. The GI management information unit 200 includes GI page configuration information 601. The GI page configuration information 601 includes, for each GI page (virtual page) that configures the GI #0, a virtual address (an address of the GI page) 204, and a pointer 206. The pointer 206 is an allocation destination of the GI page, and is typically an address of a TP page allocated to the GI page. Regarding a GI page to which a TP page is not allocated, the pointer 206 is an invalid value (for example, "Null" or a blank).

Figure 6B:
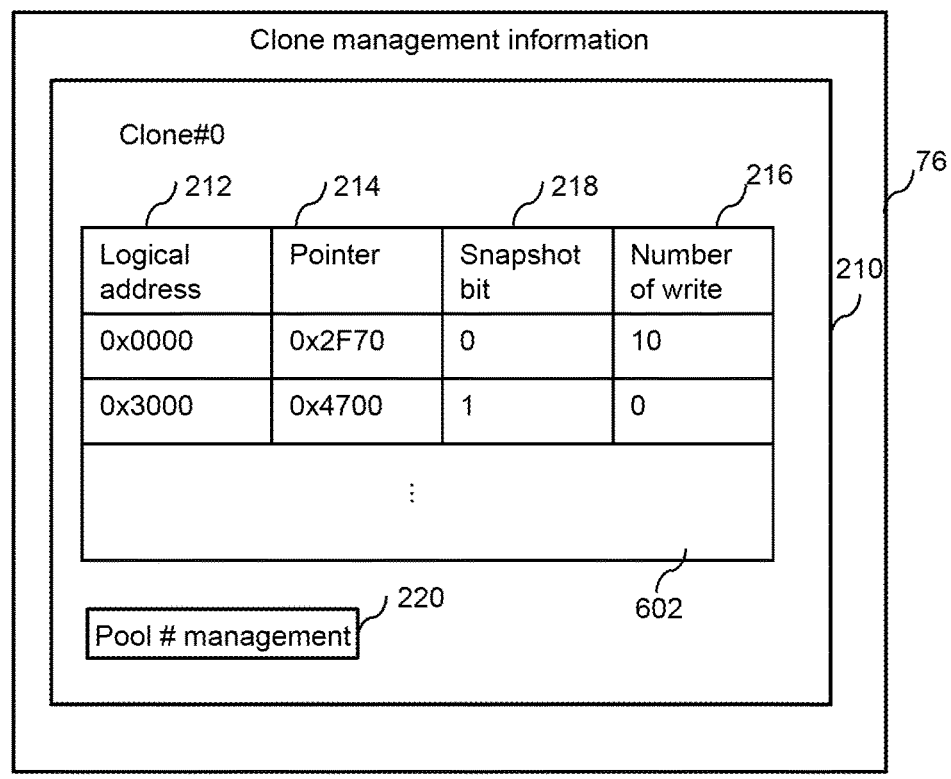
FIG. 6B is a configuration diagram of Clone management information.

FIG. 6B is a configuration diagram of the Clone management information 76.

The GI management information 74 includes, for each Clone, a Clone management information unit 210. FIG. 6B illustrates the Clone management information unit 210 of one Clone #0 as an example, and thus, in the description for FIG. 6B, the Clone #0 will be employed as an example. The Clone management information unit 210 includes pool # management information 220 and Clone page configuration information 602. The pool # management information 220 includes a pool # of a pool that includes a real page allocated to the Clone #0. The Clone page configuration information 602 includes, for each Clone page (virtual page) that configures the Clone #0, a virtual address (an address of the Clone page) 212, a pointer 214, a snapshot bit 218, and the number of write 216. The pointer 214 is an allocation destination of the Clone page, and is typically an address of a TP page allocated to the Clone page. Note that, in arbitration processing described below, the TP page is released from the Clone page, and a TP page allocated to the GI page corresponding to the Clone page may sometimes be allocated to the Clone page. In that case, the pointer 214 is an address of a real page allocated to a GI page corresponding to the Clone page. The snapshot bit 218 indicates whether the real page allocated to the Clone page is a TP page or a snapshot real page. The snapshot bit 218 is "0" when the real page allocated to the Clone page is a TP page, and is "1" when the real page allocated to the Clone page is a snapshot real page. The number of write 216 is the number of write that has occurred for the Clone page. As for a GI page to which a real page is not allocated, the pointer 214 is an invalid value (for example, "Null" or a blank).

The above is description about the management information included in the storage controller 54. Next, the management information included in the flash controller 111 will be described. Hereinafter, the flash package #0 will be employed as an example.

The package information 106 includes, for example, an FM chip # (an identification number of an FM chip) of each FM chip included in the flash package #0, and a logical block # (an identification number of a logical block) of each logical block that configures a logical space provided by the flash package #0. The FM chip information 108 includes, for example, an FM chip information unit for each FM chip, and each FM chip information unit includes, for example, an FM chip # and a physical block # (an identification number of a physical block) of each physical block included in the FM chip.

Figure 7A:
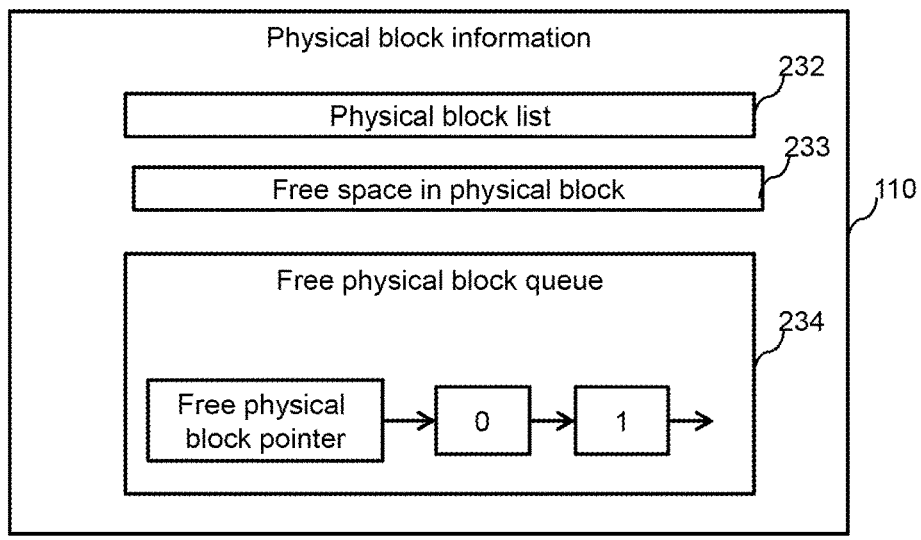
FIG. 7A is a configuration diagram of physical block information.

FIG. 7A is a configuration diagram of the physical block information 110.

The physical block information 110 includes a physical block list 232, a free space in physical block 233, and a free physical block queue 234. The physical block list 232 includes respective physical block # and physical addresses of all of the physical blocks in the flash package #0. The free space in physical block 233 indicates, for each physical block, a free space of the physical block (a total capacity expansion processing of a free physical page). In the free physical block queue 234, physical block #-s of free physical blocks are linked.

Figure 7B:
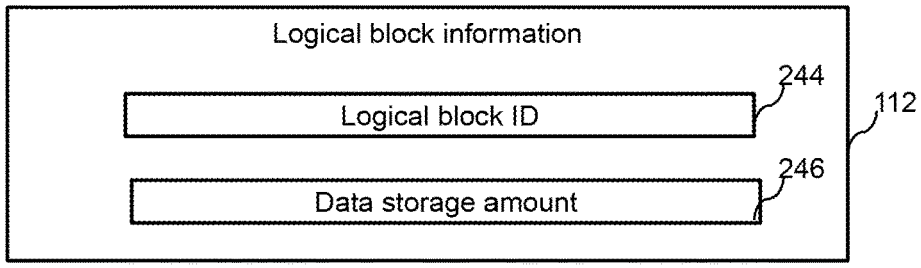
FIG. 7B is a configuration diagram of logical block information.

FIG. 7B is a configuration diagram of the logical block information 112.

The logical block information 112 includes a logical block list 244 and a data storage amount 246. The logical block list 244 includes respective logical block #-s and logical addresses of all of logical blocks that configure a logical space provided by the flash package #0. The data storage amount 246 indicates the amount of data stored in the logical space of the capacity expansion processing of the logical space.

Figure 7C:
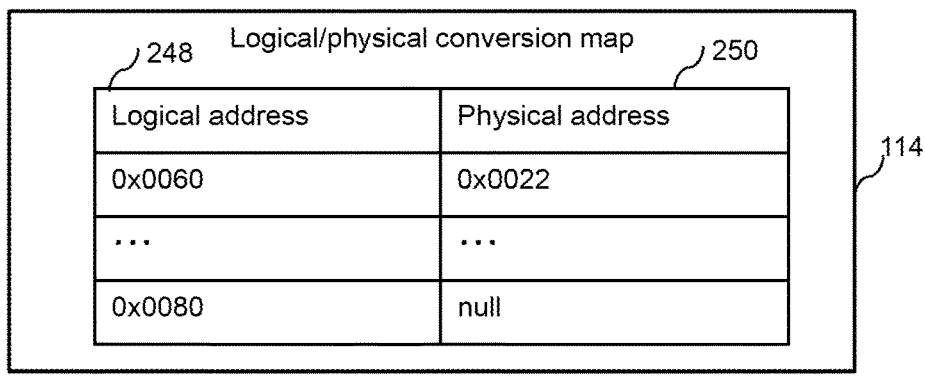
FIG. 7C is a configuration diagram of a logical/physical conversion map.

FIG. 7C is a configuration diagram of the logical/physical conversion map 114.

The logical/physical conversion map 114 include, for each logical area (for logical page in the present embodiment) that configures the logical space provided by the flash package #0, a logical address (an address of the logical area) 248, and a physical address (an address of a physical area (a physical page in the present embodiment) allocated to the logical area) 250.

Hereinafter, processing performed in the present embodiment will be described.

FIG. 8 is a flow of GI/Clone copy processing.

The GI/Clone copy processing is processing performed for each copy source stripe group. The GI/Clone copy processing is started when, for example, the storage controller 54 has received a data copy execution request from the host computer 50, when a Clone corresponding to a GI is crated, or when the storage controller 54 has received a write request that specified a Clone from the host computer 50. The GI/Clone copy processing may be performed about all of stripe groups allocated to the GI when the Clone corresponding to the GI is created, or the GI/Clone copy processing may be performed about a stripe page allocated to the GI page corresponding to the write destination Clone page when write to the Clone page has occurred. Hereinafter, one stripe group allocated to one GI page will be employed as an example, and the GI/Clone copy processing will be described. Note that, in the example of FIG. 8, the one GI page employed as an example is called "copy source GI page", and the Clone page corresponding to the copy source GI page is called "copy destination Clone page".

The storage controller 54 searches the PG management information 70 (to be specific, the stripe group management information 132 corresponding to the flash package group that is the base of the copy source stripe group) for stripe groups that meet conditions that the copy source stripe group and the P Parity storage drive #138 (and the Q Parity storage drive #140) are the same, and the bit in use 142 is "0" (free).

When no stripe groups that meet the conditions are not found (No in step 802), capacity expansion processing is performed (step 803). The capacity expansion processing is processing of adding a VOL having the same RAID configuration as the RAID configuration 126 of the flash package group 82 that is the base of the copy source stripe group to the pool, for example.

When stripe groups that meet the conditions are found (Yes in step 802), the storage controller 54 generates and transmits a copy command for each flash package that is the base of the copy source stripe group (step 804). The copy command includes a copy source address and a copy destination address. The copy source address is a logical address of a stripe provided by a transmission destination flash package of the copy command, of the copy source stripe group. The copy destination address is a logical address of a stripe provided by a transmission destination flash package of the copy command, of the stripe groups (copy destination stripe groups) that meet the conditions.

The flash package that has received the copy command executes the pseudo copy (step 805).

When having received copy completion notifications from all of the flash packages, the storage controller 54 updates the management information included in the storage controller 54 (step 806). To be specific, the storage controller 54 updates the bit in use 142 corresponding to the copy destination stripe group in the PG management information 70 from "0" to "1", for example. Further, the storage controller 54 removes the TP page # of the TP page of the copy destination stripe group from the TP page queue 164 in the pool management information 72. Further, for example, the storage controller 54 records the copy destination address in the Clone management information 76 as the pointer 214 corresponding to the logical address 212 of the copy destination Clone page.

Figure 9:
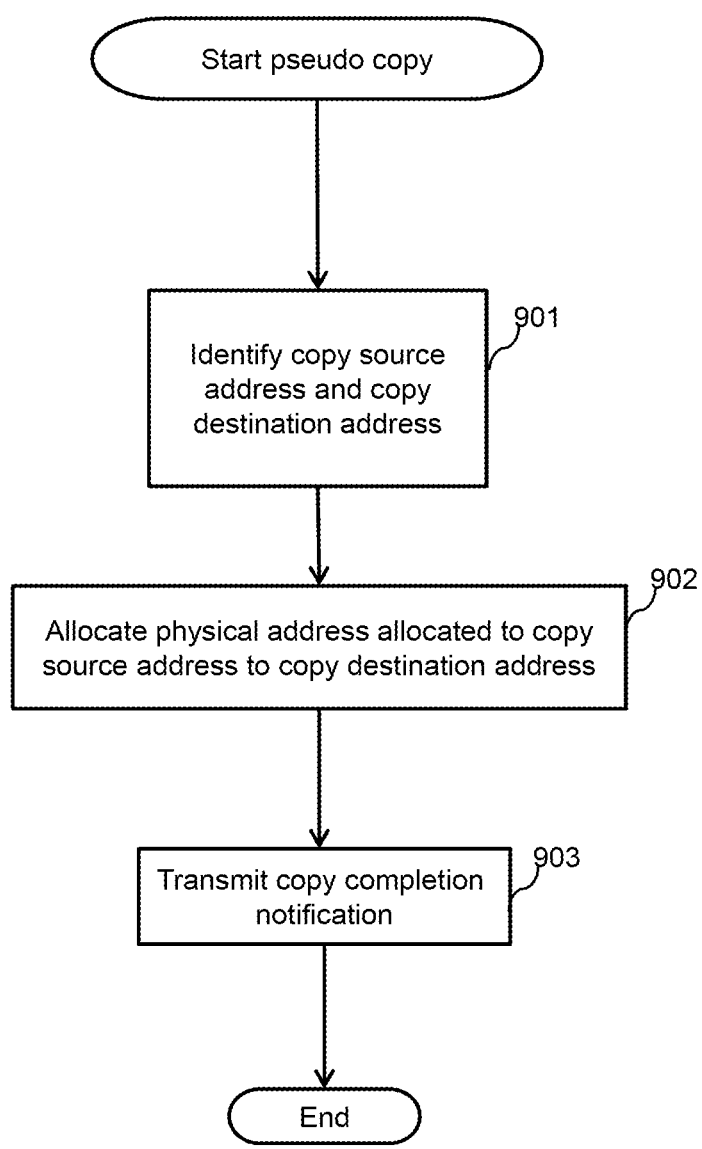
FIG. 9 illustrates a flow of pseudo copy processing with a flash package.

FIG. 9 illustrates a flow of the pseudo copy processing. The pseudo copy processing is performed by the flash controller 111 that has received the copy command according to the copy command.

The flash controller 111 identifies the copy source address and the copy destination address specified by the received copy command (step 901).

The flash controller 111 also allocates, to the logical page to which the copy destination address belongs, the physical page allocated to the logical page (stripe) to which the copy source address belongs (step 902). To be specific, the flash controller 111 records, in the logical/physical conversion map 114, the same physical address as the physical address 250 corresponding to the copy source address 248 as the physical address 250 corresponding to the copy destination address 248.

The flash controller 111 transmits copy completion notification to the storage controller 54 as a response to the received command (step 903).

By the way, as described above, a real page different from the real page allocated to the copy source GI page is allocated to the copy destination Clone page. Therefore, a free real page is consumed from the pool even though the physical capacity consumption due to copy is not actually caused.

Therefore, in the present embodiment, arbitration processing, to be specific, processing of collecting the real page (here, the free real page) allocated from the pool to the Clone page, to the pool, is performed.

Figure 10:
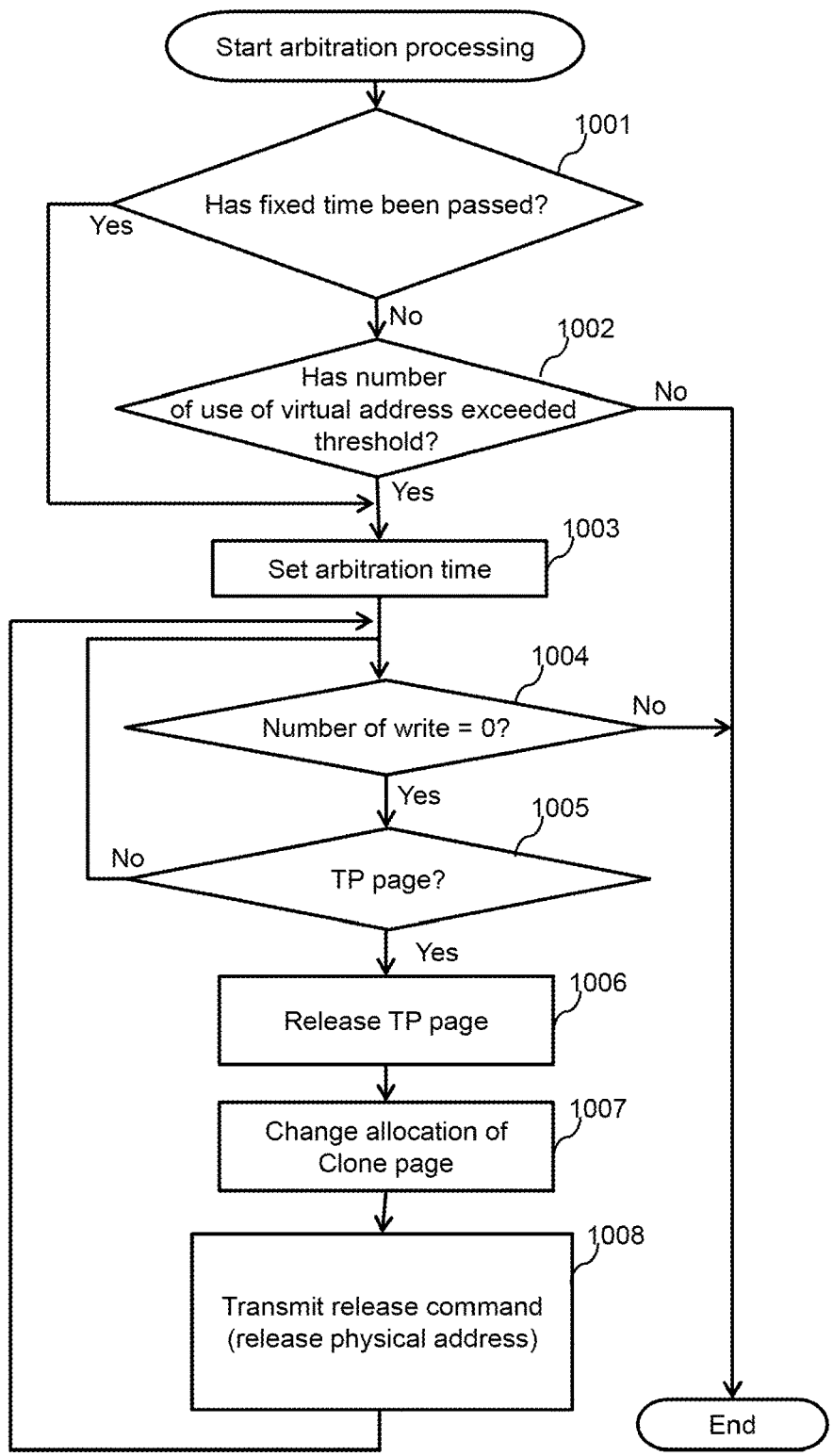
FIG. 10 illustrates a flow of arbitration processing.

FIG. 10 illustrates a flow of the arbitration processing.

The storage controller 54 determines whether a fixed time (for example, 24 hours) has passed from an arbitration start time point at an immediately previous time, or whether a fixed time (for example, 24 hours) has passed from the GI/Clone copy processing (step 1001). When the determination result of step 1001 is true (Yes in step 1001), the processing proceeds to step 1003.

When the determination result of step 1001 is false (No in step 1001), the storage controller 54 determines whether a logical address use ratio of at least one flash package that is the base on the real page allocated to the Clone exceeds a threshold (step 1002). The "logical address use ratio" is a ratio of the number of logical addresses in use to the number of logical addresses. "The number of logical addresses" is an example of a reference number, and the number of logical addresses belonging to the logical space. "The number of logical addresses in use" is an example of the number of logical addresses in use, and is the number of logical addresses to which the physical addresses are allocated. The number of logical addresses in use of the flash package may be inquired from the storage controller 54 to the flash controllers 111 when the determination of step 1002 is performed, or may be periodically collected from the flash controllers 111 by the storage controller 54 and stored in the shared memory 68. The number of logical addresses in use can be identified from the logical/physical conversion map 114 of the flash package. As the threshold, two stages of thresholds, for example, a first threshold and a second threshold that is larger than the first threshold may be employed. When the logical address use ratio exists between the first threshold and the second threshold, the determination result of step 1002 may be true.

When the determination result of step 1002 is false (No in step 1002), the arbitration processing is terminated. When the determination result of step 1001 is true (Yes in step 1001), the arbitration is started, and the storage controller 54 configures an arbitration start time point (for example, configures the arbitration start time point to the memory 66) (step 1003).

The storage controller 54 determines whether there is a low number of write Clone page, based on the Clone management information 76 (step 1004). The "low number of write Clone page" is a Clone page with the number of write 216 being a predetermined number or less, for example, the number of write 216 being "0". When the determination result of step 1004 is false (No in step 1004), the arbitration processing is terminated.

When the determination result of step 1004 is true (Yes in step 1002), the storage controller 54 determines whether a TP page is allocated to the low number of write Clone page, based on the Clone management information 76 (step 1005). When the snapshot bit 218 corresponding to the low number of write Clone page is "0", the determination result of step 1005 is true, and when the snapshot bit 218 corresponding to the low number of write Clone page is "1", the determination result of step 1005 is false.

When the determination result of step 1005 is false (No in step 1005), a snapshot page is allocated to the low number of write Clone page. Therefore, the page (snapshot page) is not released from the low number of write Clone page. Step S1004 is performed again.

When the determination result of step 1005 is true (Yes in step 1005), the storage controller 54 releases the TP page from the low number of write Clone page (step 1006). To be specific, the storage controller 54 updates the PG management information 70, more specifically, updates the bit in use 142 of the stripe group corresponding to the TP page allocated to the low number of write Clone page to "0", for example. Further, the storage controller 54 updates the pool management information 72, more specifically, causes the virtual address 158 corresponding to the low number of write Clone page to be invalid (for example, "Null" or a blank), and adds the TP page # of the TP page allocated to the low number of write Clone page to the free TP page queue 164.

The storage controller 54 also allocates, to the low number of write Clone page, the TP page allocated to the GI page corresponding to the number of write Clone page (step 1007). To be specific, the storage controller 54 identifies the pointer 206 corresponding to the GI page corresponding to the low number of write Clone page from the GI management information 74, and records the same pointer 206 as the identified pointer 206 in the Clone management information 76 as the pointer 214 corresponding to the low number of write Clone page.

The storage controller 54 transmits a release command to each of the flash packages that are the base of the TP page allocated to the low number of write Clone page (step 1008). In the release command, the logical address belonging to the stripe in the stripe group corresponding to the TP page allocated to the low number of write Clone page is specified. The flash controller 111 of each of the flash packages receives the release command, and releases the physical area (for example, the physical page from the logical area (for example, the logical page) belonging to the logical address specified by the release command. To be specific, the flash controller 111 causes the physical address 250 corresponding to the logical address 248 specified by the release command, in the logical/physical conversion map 114, to be an invalid value (for example, "Null" or blank).

Following that, step 1004 is performed with respect to other Clone pages with which the determination of step 1004 has not been performed.

According to the arbitration processing, the same TP page as the TP page allocated to the corresponding GI page is allocated to the low number of write Clone page. Accordingly, when write to the low number of write Clone page occurs afterward, the user data is read from the TP page allocated to the corresponding GI page by the storage controller 54 to the cache memory 60, and the read user data is updated by the storage controller 54. Meanwhile, a different TP page from the TP page allocated to the corresponding GI page is allocated to the Clone page that is not the low number of write Clone page. Accordingly, when write to the Clone page occurs afterward, write-once type write is caused in each of the flash packages without reading the user data from the TP page allocated to the corresponding GI page by the storage controller 54. That is, with the arbitration processing, whether the storage controller or the flash package that is in charge of data update is sorted, for each Clone page, according to the number of write.

Note that, in the arbitration processing, a second logical address ratio may be employed, in place of or in addition to the first logical address use ratio. The second logical address use ratio is a ratio of the number of logical addresses in use to the number of physical addresses in use. "The number of physical addresses in use" is an example of a reference number, and is the number of physical addresses allocated to the logical space. When at least one of the first and second logical address use ratio exceeds a threshold about at least one flash package, the determination result in step 1002 may be true. The number of physical addresses in use can be identified from the logical/physical conversion map 114, and may be acquired from the flash package 86.

Figure 11A:
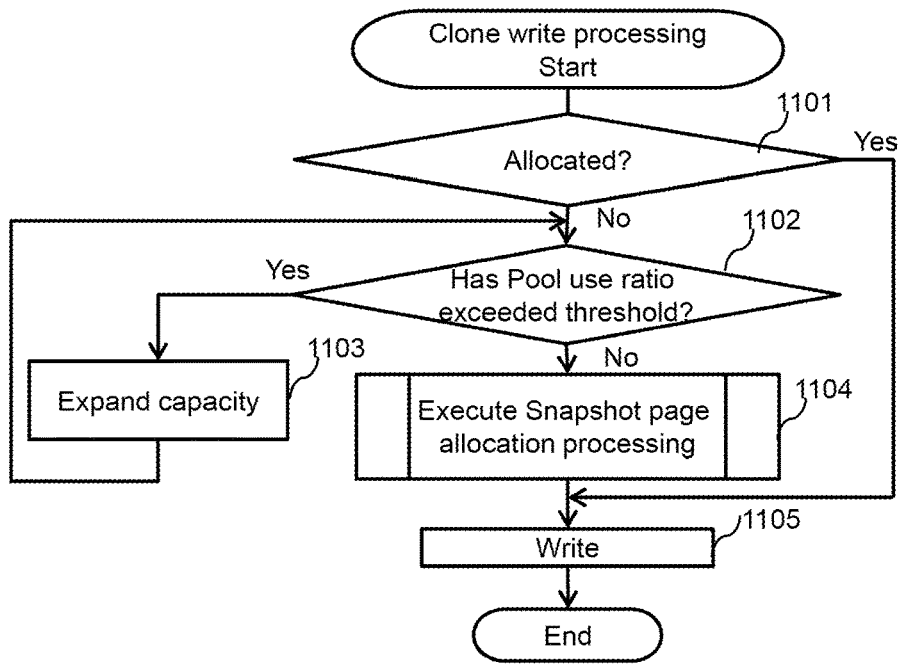
FIG. 11A illustrates a flow of processing of a write request that specifies Clone.

FIG. 11A illustrates a flow of processing of a write request that specified a Clone.

When having received a write request that specifies a Clone, the storage controller 54 determines whether a page (a TP page or a snapshot page) different from the TP page allocated to the GI page corresponding to the write destination Clone page is allocated to the write destination Clone page (the Clone page to which the address specified in the write request belongs) (step 1101). To be specific, the storage controller 54 identifies the pointer 214 corresponding to the write destination Clone page from the Clone management information 76, and determines whether there is the same pointer 206 as the identified pointer 214 in the GI management information 74, for example. When the determination result is true, the same TP page as the TP page allocated to the GI page corresponding to the write destination Clone page is allocated to the write destination Clone page, and thus the determination result of step 1101 is false.

When the determination result of step 1101 is true (Yes in step 1101), the storage controller 54 writes the user data according to the write request to the page (the TP page or the snapshot page) allocated to the write destination Clone page (step 1105). To be specific, the storage controller 54 transmits a write command for writing the user data portions or the parity based on the user data according to the write request, to the flash controller 111 of each of the flash packages that are the base of the page allocated to the write destination Clone page, for example. Further, the storage controller 54 updates the Clone management information 76, more specifically, adds 1 to the number of write 216 corresponding to the write destination Clone page.

When the determination result of step 1101 is false (No in step 1101), the storage controller 54 determines whether the use ratio of the pool associated with the write destination Clone (the Clone specified by the received write request exceeds a predetermined ratio (step 1102). The "use ratio of the pool" is a ratio of the number of TP pages that have been allocated from the pool to the number of TP pages that configure the pool. When the determination result of step 1102 is true (Yes in step 1102), capacity expansion processing is performed. The capacity expansion processing is processing of adding a VOL to the pool, for example.

When the determination result of step 1102 is false (No in step 1102), the storage controller 54 performs snapshot page allocation processing of allocating N snapshot pages to the write destination Clone page (step 1104, and writes updated user data in the allocated N snapshot pages (step 1105). To be specific, the storage controller 54 updates the user data saved in the cache memory 60 in the snapshot page allocation processing, using the data according to the received write request, and transmits a write command for writing data (user data portions or a parity) based on the updated user data, to the flash controller 111 of each of the flash packages that are the base of the N snapshot pages, for example. Further, the storage controller 54 updates the Clone management information 76, more specifically, updates the snapshot bit 218 corresponding to the write destination Clone page to "1".

Figure 11B:
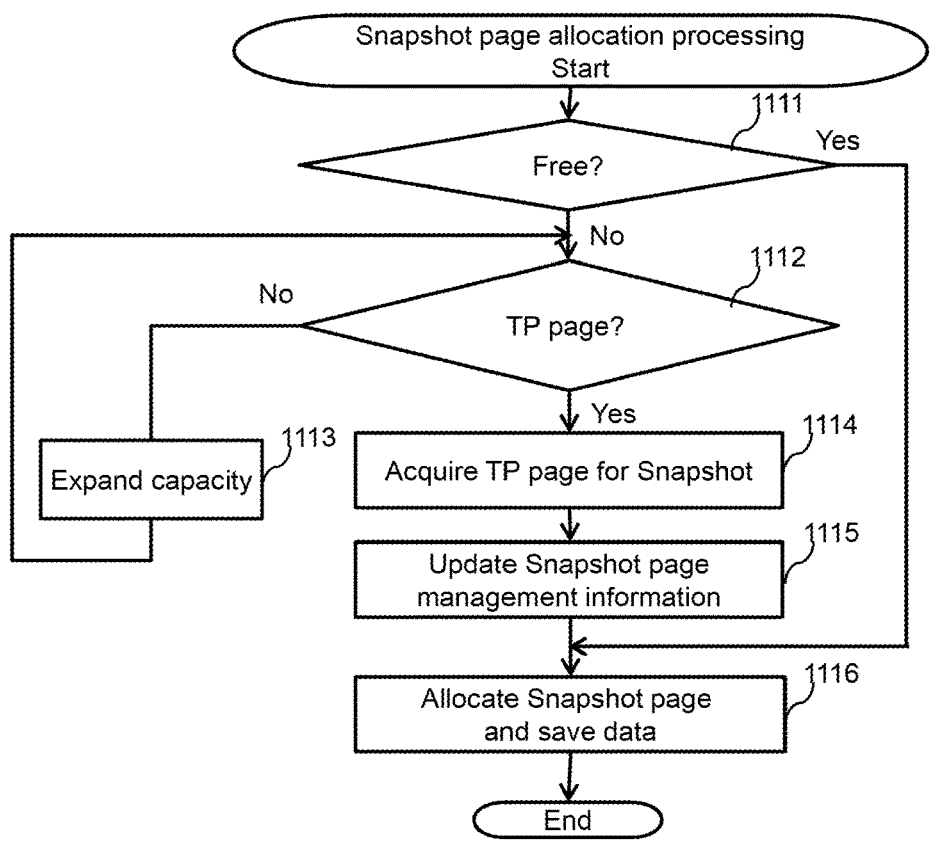
FIG. 11B illustrates a flow of snapshot page allocation processing.

FIG. 11B illustrates a flow of the snapshot page allocation processing (step 1104 of FIG. 11A).

The storage controller 54 determines whether there are N free snapshot pages (step 1111). To be specific, the storage controller 54 determines whether N snap page #-s are associated with the free snapshot page queue 182, for example. Here, the "N" is a quotient obtained such that the size of the TP page is divided by the size of the snapshot page.

When the determination result of step 1111 is true (Yes in step 1111), the storage controller 54 allocates the N free snapshot pages to the write destination Clone page, and saves (reads) the user data from the TP page allocated to the GI page corresponding to the write destination Clone page to the cache memory 60 (step 1116). At that time, for example, the storage controller 54 takes out N snap page #-s from the free snapshot page queue 182, and updates the pool management information 72, more specifically, records the virtual addresses 178 of respective allocation destinations of the N snapshot pages to the respective taken out N snap page #-s.

When the determination result of step 1111 is false (No in step 1111), the storage controller 54 determines whether there is a free TP page (step 1112). When the determination result of step 1112 is false (No in step 1112), the storage controller 54 performs the capacity expansion processing. The capacity expansion processing may be, for example, processing of adding a VOL to the pool, or may be the arbitration processing of increasing a free TP page (FIG. 10).

When the determination result of step 1112 is true (Yes in step 1112), the storage controller 54 acquires a free TP page as the snapshot real page (step 1114), and updates the pool management information 72 (step 1115). In step 1115, for example, the storage controller 54 divides the free TP page into N snapshot pages ("N" is a quotient obtained by dividing of the size of the TP page by the size of the snapshot page), and assigns snapshot page #-s of the respective snapshot pages. Then, the storage controller 54 adds a new record to the snapshot page management information 172, and records, in the added record, the TP page #174 of the free TP page, and the respective snapshot page #-s 176 of the N snapshot pages. After step 1115, the storage controller 54 performs step 1116 described above. That is, the storage controller 54 allocates the N snapshot pages to the write destination Clone page, and saves (reads) the user data from the TP page allocated to the GI page corresponding to the write destination Clone page to the cache memory 60.

While an embodiment has been described, this is a mere example for describing the present invention, and it is not intended to limit the scope of the present invention to the embodiment. The present invention can be implemented with various types of other embodiments.

REFERENCE SIGNS LIST

52 Storage system

The invention claimed is:

1. A storage system comprising:
a storage device group that includes one or more storage devices, wherein each of the one or more storage device includes;
a storage medium that includes a plurality of physical areas, and
a medium controller communicatively coupled to the storage medium, wherein the medium controller provides a logical space configured with a plurality of logical areas and allocates a respective physical area from the plurality of physical areas to a respective logical area from the plurality of logical areas;
a plurality of real areas that each correspond to one or more logical areas respectively provided by the one or more storage devices, wherein user data stored in a first real area from the plurality of real areas are respectively stored in one or more physical areas respectively allocated to one or more logical areas corresponding to the first real area,
a storage controller that manage the plurality of real areas, wherein the storage controller;
manage a first virtual volume that includes a plurality of first virtual areas and to which the first real area is allocated,
manages a second virtual volume that includes a plurality of second virtual areas as a clone of the first virtual volume,
allocates a second real area to a particular second virtual area before a write occurs in the particular second virtual area corresponding to a particular first virtual area to which the first real area is allocated,
receive a write request that specifies the second virtual volume from a host computer,
manages an access load of each second virtual area,
determines whether there is a low-access load area that is the particular second virtual area having the access load being a predetermined load or less, and
releases the second real area from the low-access load area, and allocate the first real area to the low-access load area when there is the low-access load area, and the second real area is allocated to the low-access load area; and
wherein the medium controller of each of the storage devices allocates a particular physical area allocated to the logical area corresponding to the first real area to a particular logical area corresponding to the second real area.

2. The storage system according to claim 1,
wherein the storage device group is a RAID group configured with a plurality of storage devices,
wherein, there is a plurality of stripe groups, each stripe group extending over the plurality of storage devices of the storage device group,
and
wherein the second real area is a particular real area corresponding to a first stripe group having a parity stored in a particular storage device that is a same storage device in which a parity of user data stored in a second stripe group corresponding to the first real area is stored.

3. The storage system according to claim 2,
wherein the storage controller further:
manages, for each stripe group, a target storage device in which the parity is stored, and
searches for an unused stripe group having a parity stored in the storage device that is a same storage device in which the parity of user data stored in a stripe group corresponding to the first real area is stored; and
wherein the real area corresponding to the unused stripe group is the second real area.

4. The storage system according to claim 1, wherein the storage controller further:
transmits one or more copy commands to each of the storage devices, wherein each of the copy commands includes a copy source address that is an address of the logical area corresponding to the first real area, and a copy destination address that is an address of the logical area corresponding to the second real area, and
wherein the medium controller of each of the storage devices further receive a particular copy command from the one or more copy commands, and allocate a physical area allocated to the logical area to which the copy source address specified by the particular copy command belongs to the logical area to which the copy destination address belongs, according to the particular copy command.

5. The storage system according to claim 1,
wherein the storage controller further: transmits a release command that specifies an address of the logical area corresponding to the second real area to the each of the storage devices when there is the low-access load area, and the second real area is allocated to the low-access load area, and wherein the medium controller of each of the storage devices further receives the release command, and releases a physical area from the logical area to which the address specified by the release command belongs, according to the release command.

6. The storage system according to claim 1, wherein the storage controller includes a first memory that is a cache memory, and wherein, when a real area allocated to the second virtual area of a write destination according to the write request is the first real area, the storage controller:

reads user data from the first real area to the first memory, updates the user data using write target data according to the write request, and allocates a third real area to the second virtual area of the write destination as a write destination of the user data, in place of the first real area.

7. The storage system according to claim 6, wherein the storage controller further transmit a write command that specifies an address of the logical area corresponding to the second real area to each of the storage devices when a real area allocated to the second virtual area of the write destination according to the received write request is the second real area, wherein the medium controller of each of the storage devices includes a second memory, and wherein, when having received the write command that specifies an address of the logical area to which a physical area is allocated, the medium controller of each of the storage devices further reads data from the allocated physical area to the second memory, update the data in the second memory with write target data, and write the updated data in a new physical area allocated to the logical area of the write destination, in place of the allocated physical area.

8. The storage system according to claim 6, wherein the storage controller further manages the third real area allocated to the second virtual area of the write destination, in place of the first real area, as a snapshot real area, and manages the second virtual area of the write destination as a snapshot virtual area that is a second virtual area to which the snapshot real area is allocated, and wherein the storage controller releases the third real area from the low-access load area when the low-access load area is the snapshot virtual area.

9. The storage system according to claim 8, wherein the storage controller further:

divides a real area used as the snapshot real area into a plurality of sub real areas, and manage the plurality of sub real areas, and wherein, when the second virtual area of the write destination according to the write request is a second virtual area to which the plurality of sub real areas is allocated, the storage controller is configured to allocate a free sub real area to a sub real area corresponding to an update portion, of the plurality of sub real areas allocated to the second virtual area of the write destination.

10. The storage system according to claim 1, wherein the access load is a count of a number of writes.

11. The storage system according to claim 1, wherein the storage controller determines whether there is a low-access load when a logical area use ratio of at least one storage device that is a base of a real page allocated to the second virtual volume exceeds a threshold, wherein the logical area use ratio of the storage device is a ratio of a number of logical areas in use to a reference number, and wherein the number of logical areas in use is the number of logical areas to which a physical area is allocated.

12. The storage system according to claim 1, wherein the storage medium is a flash memory, and wherein each of the storage devices is a flash memory device.

13. The storage system according to claim 1, wherein a time period before write occurs in the second virtual area corresponding to the first virtual area to which the first real area is allocated is at a time of copying data from the first virtual area to the second virtual area.

14. A storage control method comprising:

providing, by each medium controller of one or more storage devices, a logical space configured with a plurality of logical areas;

allocating, by each medium controller of the plurality a respective physical area from a plurality of physical areas of the one more storage devices to a respective logical area from the plurality of logical areas;

managing, by a storage controller, a first virtual volume that includes a plurality of first virtual areas and to which a first real area from a plurality of real areas is allocated, wherein the plurality of real areas that each correspond to one or more logical areas respectively provided by the one or more storage devices;

managing, by the storage controller, a second virtual volume that includes a plurality of second virtual areas as a clone of the first virtual volume;

allocating, by the storage controller, a second real area to a particular second virtual area before a write occurs in the particular second virtual area corresponding to a particular first virtual area to which the first real area is allocated;

managing, by the storage controller, an access load of each second virtual area;

determining, by the storage controller, whether there is a low-access load area that is the particular second virtual area having the access load being a predetermined load or less; and releasing, by the storage controller, the second real area from the low-access load area, and allocate the first real area to the low-access load area when there is the low-access load area, and the second real area is allocated to the low-access load area.

* * * * *